United States Patent
Kuralt et al.

[11] Patent Number: 6,132,287
[45] Date of Patent: Oct. 17, 2000

[54] TRANSFORMING TRACKED TOY VEHICLE

[76] Inventors: Richard Blake Kuralt, 1757 W. Crystal St., Chicago, Ill. 60622; Michael A. Parness, 412 Gregory's Way, Voorhees, N.J. 08043; Nathan David Bloch, 16 N. Green Acre Dr., Cherry Hill, N.J. 08003

[21] Appl. No.: 08/914,727

[22] Filed: Aug. 19, 1997

[51] Int. Cl.[7] .................................................. A63H 17/14
[52] U.S. Cl. ........................................... 446/433; 446/431
[58] Field of Search ..................................... 446/431, 433, 446/454, 456, 465, 466, 460; 180/9.1, 9.5, 9.52

[56] References Cited

U.S. PATENT DOCUMENTS

| | | |
|---|---|---|
| 1,871,297 | 8/1932 | Berger . |
| 2,586,239 | 2/1952 | Mac Kenzie ............................ 446/427 |
| 2,860,715 | 11/1958 | Bouffort . |
| 3,447,620 | 6/1969 | Schoonover ............................ 180/9.52 |
| 4,194,584 | 3/1980 | Kress et al. . |
| 4,380,135 | 4/1983 | Wildman et al. ....................... 446/443 |
| 4,483,407 | 11/1984 | Iwamoto et al. . |
| 4,822,316 | 4/1989 | Shaffer et al. . |
| 4,850,929 | 7/1989 | Genevey . |
| 4,932,831 | 6/1990 | White et al. ............................ 414/732 |
| 5,135,427 | 8/1992 | Suto et al. . |
| 5,322,469 | 6/1994 | Tilbor . |
| 5,372,534 | 12/1994 | Levy et al. . |
| 5,474,486 | 12/1995 | Chilton et al. . |
| 5,484,321 | 1/1996 | Ishimoto . |
| 5,667,420 | 9/1997 | Menow et al. . |
| 5,667,421 | 9/1997 | Uetake ................................... 446/470 |

FOREIGN PATENT DOCUMENTS

| | | | |
|---|---|---|---|
| 647396 | 3/1936 | Germany ............................... | 446/433 |
| 6211156 | 8/1994 | Japan .................................... | 180/9.52 |

OTHER PUBLICATIONS

"TYCO 1993" Catalog, Tyco Toys, Inc., Mount Laurel, New Jersey, 1993 cover and pp. 6,7 and 16.
"TYCO/TYCO TOYS 1995" Catalog, Tyco Toys, Inc.,, Mount Laurel, New Jersey, 1995, cover and pp. 6, 7 and 11.
"TYCO/Toys 1996" Catalog, Tyco Toys, Inc., Mount Laurel, New Jersey, 1996, cover and pp. 4 and 5.
F.D. Jones, Ingenious Mechanism for designers and engineers, Industrial Press Inc., New York, New York, 1930, vol. 1, cover, notice page and pp. 177–180.

*Primary Examiner*—Robert A. Hafer
*Assistant Examiner*—Michael Priddy
*Attorney, Agent, or Firm*—Panitch Schwarze Jacobs & Nadel, P.C.

[57] ABSTRACT

A toy vehicle comprises a chassis having a front end, a rear end and first and second lateral sides extending between the ends. Two wheel trains are disposed on separate lateral sides of the chassis. Each train includes first, second, third and fourth wheels, a first pair of the wheels being mounted on separate axles fixed with respect to the chassis and a second pair of the wheels being mounted on separate axles movable along the first lateral side of the chassis. A separate continuous track extends about each wheel train so that the track engages over at least the first wheel and another other wheel. A separate linkage connects each second pair of wheels with the chassis and is configured to displace the second pair of wheels between a first wheel arrangement in which the wheels of the train are generally disposed in a single row, and a second wheel arrangement in which the wheels of the train are generally disposed in two rows and all the wheels engage the track. A separate ratchet and pawl mechanism connects each linkage to each first wheel so that the wheels drive the linkages. Two motors are mounted to the chassis and engaged with separate first wheels, the motors driving the wheel trains independently of each other to move the vehicle. A simulated blade and two body panels are rotatably attached to the chassis and connected with the linkages and are moveable between first and second positions.

15 Claims, 6 Drawing Sheets

TRANSFORMING TRACKED TOY VEHICLE

BACKGROUND OF THE INVENTION

The present invention relates to toy vehicles and, more specifically, to tracked toy vehicles having mechanisms for changing the arrangement of the wheels.

Tracked toy vehicles are known. For example, U.S. Pat. Nos. 1,871,297, and 5,135,427 both disclose toy vehicles having two wheel trains that drive a separate continuous track to move the vehicle. Further, tracked toy vehicles having one or more motors, particularly radio-controlled motors, that drive the wheel trains of the tracked vehicles are shown in U.S. Pat. No. 5,135,427.

Furthermore, tracked vehicles having mechanisms for changing the position of one or more of the wheels of the wheel trains are shown in both U.S. Pat. No. 4,483,407 of Iwamoto et al. and U.S. Pat. No. 2,860,715 of Bouffort. In Iwamoto et al., a vehicle for transporting a television camera and a manipulator arm has two wheel trains on opposite sides. Each wheel train has four wheels on axles fixed to the chassis and a fifth wheel mounted on a mechanism which moves the fifth wheel in an arcuate path around the fixed wheels so that the continuous tracks are configured in either a generally triangular arrangement or in the standard two-sided tractor configuration. Bouffort discloses a tracked vehicle for carrying at least one person, and preferably a weapon, that is powered by an internal combustion engine. The Bouffort vehicle has two wheel trains each having two wheels fixed to the chassis and three wheels mounted on separate lever arms that are movable so as to move the wheels with respect to the chassis.

Although tracked toy vehicles are known as described above, none of the known toy vehicles have a mechanism(s) for moving the wheels of the wheel trains. It would be desirable to provide a tracked toy vehicle capable of moving one or more wheels of the wheel trains so as to provide different modes of operation and/or to transform the appearance of the vehicle.

BRIEF SUMMARY OF THE INVENTION

In a first aspect, the present invention is a toy vehicle comprising a chassis having a front end, a rear end and first and second lateral sides extending between the ends. A wheel train is disposed on the first lateral side of the chassis and includes first, second, third and fourth wheels. A first pair of the wheels of the train are mounted on separate axles fixed with respect to the chassis and a second pair of the wheels of the train are mounted on separate axles movable along the first lateral side of the chassis. A continuous track extends about the wheel train so that the track engages over the first wheel and at least one of the remaining three wheels of the four wheels. A linkage connects the second pair of wheels with the chassis and is configured to displace the second pair wheels between a first wheel arrangement in which the wheels of the train are generally disposed in a single row and a second wheel arrangement in which the wheels of the train are generally disposed in two rows and all four wheels engage the track.

In a second aspect, the present invention is also a toy vehicle comprising a chassis having a first end, a second end and first and second lateral sides. A motor is mounted to the chassis and a drive axle is connected with the motor and having at least a first end. A wheel train is disposed on the first lateral side of the chassis and includes first, second, third and fourth wheels. The first and third wheels are mounted on axles fixed to the chassis, the drive axle being drivingly engaged with the first wheel. The second and fourth wheels are mounted on axles movable along the first lateral side of the chassis. A continuous track extends about the wheel train so that the track engages over the first wheel and at least one of the remaining three wheels of the four wheels. A linkage connects the second and fourth wheels with the chassis and is configured to displace the second and fourth wheels from a first wheel arrangement to a second wheel arrangement.

In a third aspect, the present invention is also a toy vehicle comprising a chassis having a front end, a rear end and first and second lateral sides extending between the ends. At least one wheel train is disposed on the first lateral side of the chassis and includes first, second, third and fourth wheels. The first and third wheels are mounted on axles fixed to the chassis and the second and fourth wheels are mounted on axles movable along the first lateral side of the chassis. A continuous track extends about the wheel train so that the track engages over at least the first wheel and the fourth wheel of the wheel train. At least one linkage connects the second and fourth wheels with the chassis, the linkage moving the second and fourth wheels from a first wheel arrangement in which the continuous track forms less than four generally straight track sections to a second wheel arrangement in which the continuous track forms four generally straight track sections, the track sections being substantially tangent to different pairs of wheels.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there is shown in the drawings, which are diagrammatic, embodiments which are presently preferred. It should be understood, however, that the invention is not limited to the precise arrangements and instrumentalities shown. In the drawings.

DETAILED DESCRIPTION OF THE INVENTION

In the drawings, like numerals are used to indicate like elements throughout. Certain terminology is used in the following description for convenience only and is not limiting. The words "right", "left", "lower", "upper" and "upward" and "downward" designate directions in the drawings to which reference is made. The words "front", "frontwards" and "rear", "rearward" refer to directions toward and away from, respectively, a designated front end of the toy vehicle. The word "inner", "inward" and "outer" and "outward", refer to directions toward and away from, respectively, the center line of the toy vehicle. The terminology includes the words above specifically mentioned, derivatives thereof, and words of similar import.

Referring now to the drawings in detail, wherein like numerals are used to indicate like elements throughout, there is shown in FIGS. 1–7 a presently preferred embodiment of a toy vehicle 10. Referring to various of the FIGS. 1–4, the vehicle 10 comprises a chassis 12 having a front end 20, a rear end 21, and first and second lateral sides 22A, 22B extending between the ends 20 and 21. Preferably, a body 24 is mounted to the chassis covering at least part of an upper surface of the chassis 12. The chassis 12 and the body 24 are substantially similar to the corresponding components of the toy vehicle described in U.S. Pat. No. 5,135,427 of Suto et al., which is incorporated by reference in its entirety herein. Although a detailed description of the chassis 12 and the body 24 is beyond the scope of the present disclosure. Certain vehicle features are described herein, but the recitation of some components of U.S. Pat. No. 5,135,427 does not exclude the non-recited components of U.S. Pat. No. 5,135,427 being incorporated into vehicle 10.

Figure 2:
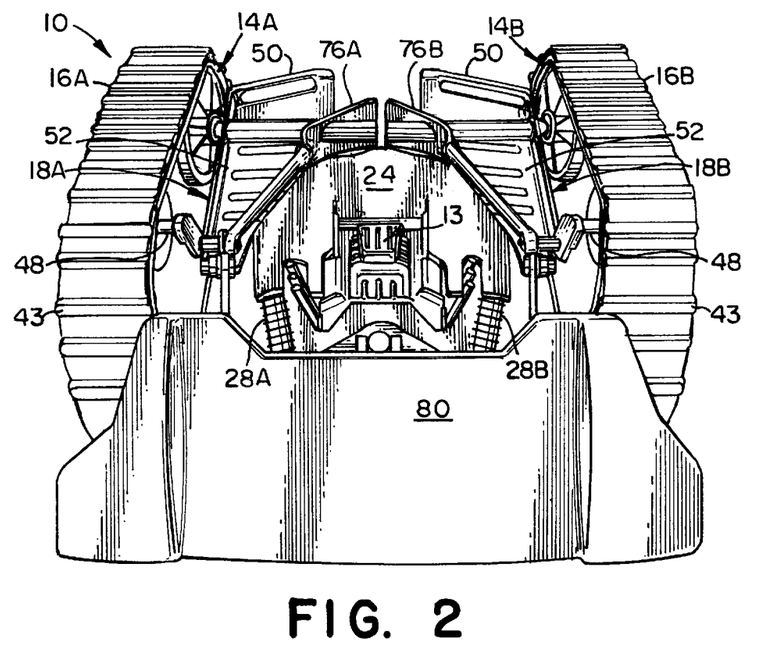
FIG. 2 is a rear perspective view of the toy vehicle, shown in a second configuration.

Preferably, an on-off switch (not shown) is located on the bottom of the chassis 12 to regulate the flow of current from the battery pack. A receiving substrate or circuit board (not shown) is provided with integrated radio signal receiving and processing circuitry and is mounted to the chassis 12, preferably disposed within the vehicle between the chassis 12 and body 24. Preferably, the toy vehicle 10 further includes surface ornamentation 13, including a simulated engine block and exhaust piping, so as to provide the appearance of a conventional, full-sized motorized vehicle, and may also include one or more pairs of functional or simulated shock absorbers 28A, 28B at the front or rear ends 20, 21, respectively, of the chassis 12, such as the pair 28A, 28B at the rear end 21 of the chassis 12 as shown in FIGS. 2 and 4.

Figure 4:
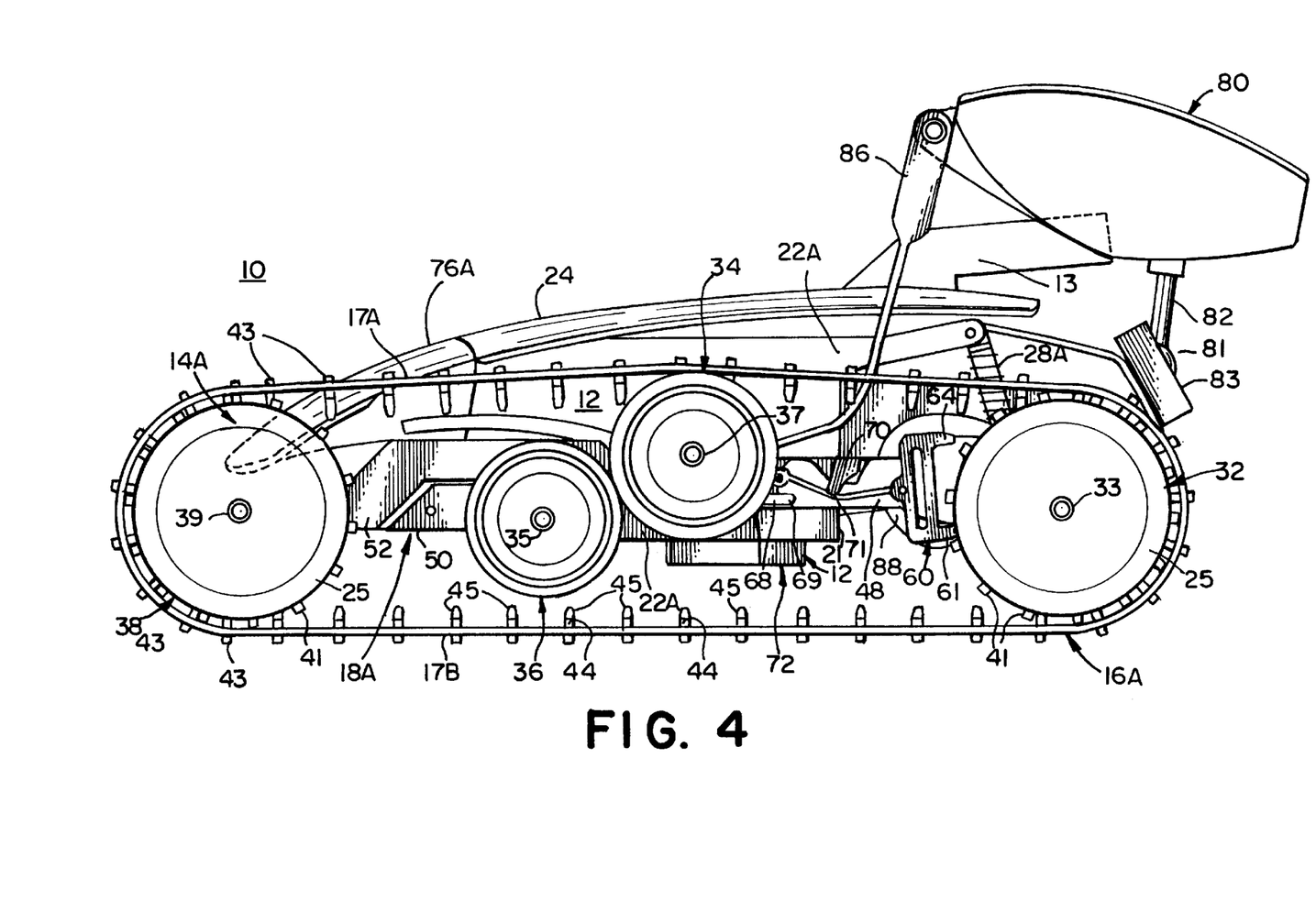
FIG. 4 is a side elevational view of the toy vehicle in the first configuration, showing the linkage in a first extreme position.
Figure 4A:
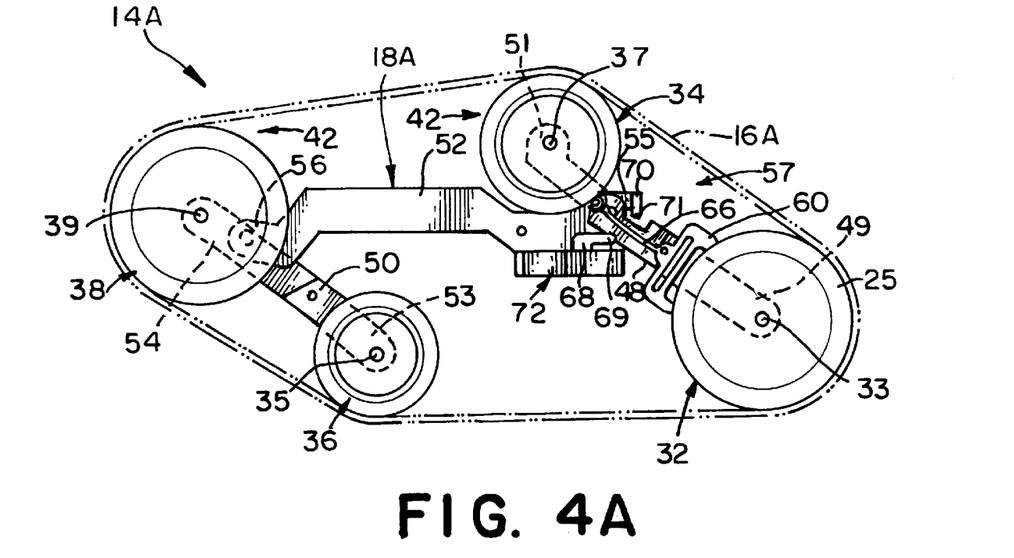
FIG. 4A is a more diagrammatic view of the wheel train, linkage and track of FIG. 4, showing the linkage in a first intermediate position.
Figure 4B:
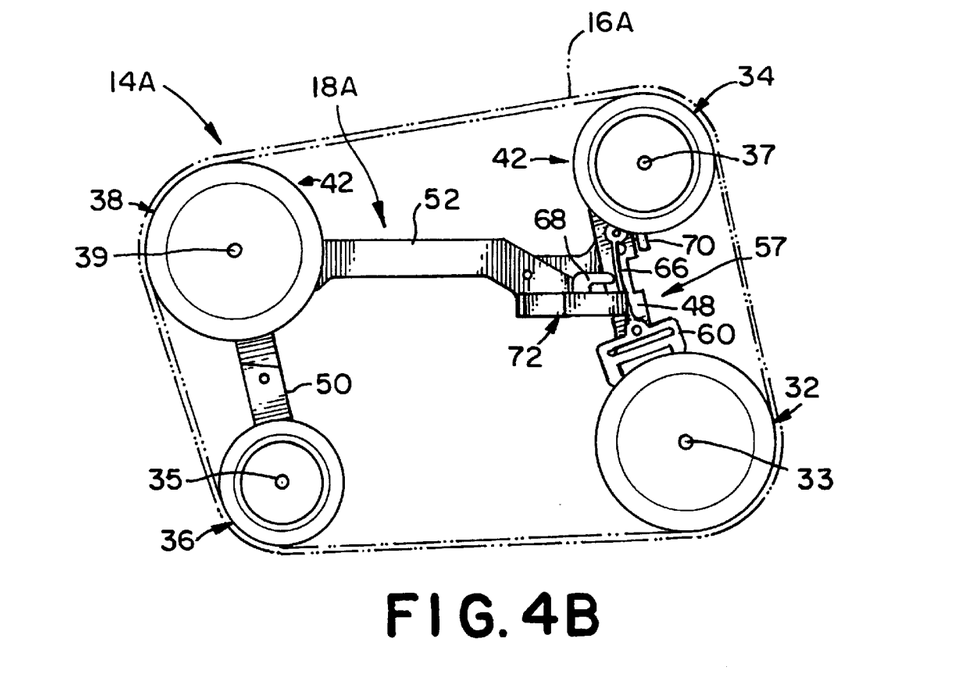
FIG. 4B is a view of the wheel train of FIG. 4A shown in a second intermediate position.
Figures 4C, 7:
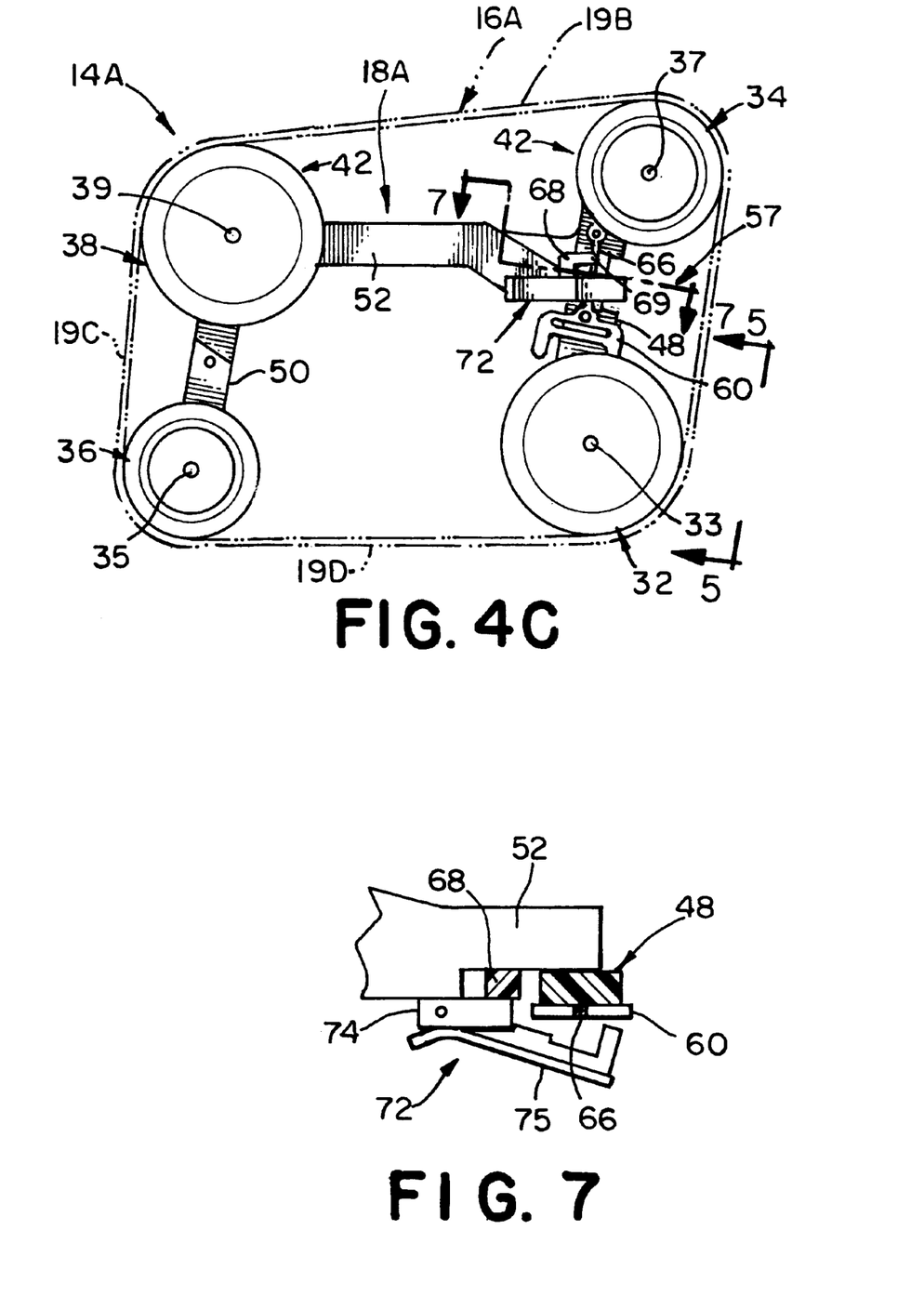
FIG. 4C is a view of the wheel train of FIG. 4A, shown in a second extreme position.
FIG. 7 is view through line 7—7 of FIG. 4C.

As shown in FIGS. 4–4C, the vehicle 10 further comprises a first wheel train indicated generally at 14A which is disposed on a first lateral side 22A of the chassis 12. A continuous track 16A extends about the wheel train 14A. A linkage indicated generally at 18A pivotally connects a pair of wheels with the chassis 12, as each is described in further detail below. Preferably, the toy vehicle 10 includes a second wheel train 14B (not shown in FIGS. 4–4C) disposed on a second lateral side of the chassis 12, a second continuous track 16B and a second linkage 18B, which are substantially identical to, but are mirror images of, the wheel train 14A, continuous track 16A and linkage 18A, respectively, on the first lateral side of the chassis. For convenience and clarity only, the remaining description of the toy vehicle 10 focuses primarily on the first wheel train 14A, first continuous track 16A and first linkage 18A, but the description is equally applicable to the second wheel train 14B (not shown in FIGS. 4–4C but indicated diagrammatically in FIGS. 1 and 2), second continuous track 16B and second linkage 18B.

Still referring to FIGS. 4–4C, the first wheel train 14A includes first, second, third and fourth wheels, 32, 34, 36, and 38, respectively. A first pair of the wheels of the train 14A, preferably the first and third wheels 32 and 36, are mounted on axles 33, 35, respectively, fixed in location with respect to the chassis 12. A second pair of the wheels, preferably the second and fourth wheels 34, 38, respectively, are mounted on separate axles 37, 39, respectively, movable in location with respect to the chassis along the first lateral side 22 of the chassis 12.

Figure 5:
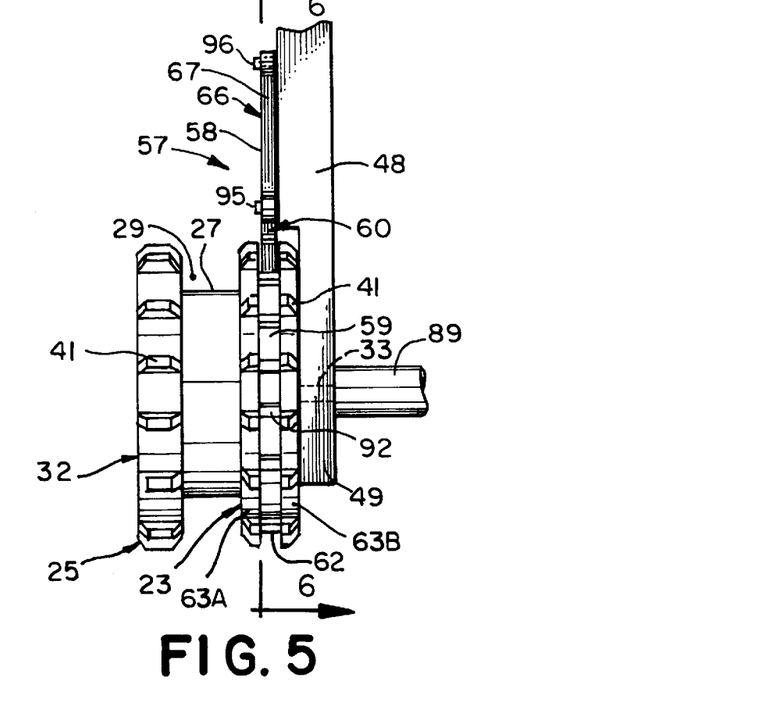
FIG. 5 is a view along line 5—5 of FIG. 4C.

Referring particularly to FIG. 5, each wheel 32, 34, 36 and 38 is preferably formed of inner and outer rims 23, 25, respectively, joined together by a central hub 27 so as to form an annular recess 29 between the rims 23, 25. Each wheel 32, 34, 36 and 38 is either a one-piece construction or formed of two or more separate pieces joined together by appropriate means (e.g., friction, adhesives, keying, etc.). As shown in FIGS. 4 and 5, first wheel 32 (and fourth wheel 38) includes a plurality of teeth 41 extending radially outwardly from each of the two rims 23, 25. The teeth 41 are configured to engage with transverse ribs 44 extending from the inner surface of the continuous track 16A, as described below. Further, both of the rims 23, 25 of the first wheel 32 and the fourth wheel 38 preferably have a diameter greater than the outer diameter of each of the second and third wheels 34, 36, which also lack teeth 41. Alternatively, the second, third and fourth wheels 34, 36 and 38, respectively, can be constructed of substantially the same dimensions and smaller than the first wheel 32. Furthermore, the inner rim 25 of wheel 32 is a composite of a ratchet wheel 62 disposed between two larger diameter sub-rims 63A, 63B, as depicted in FIG. 5 and described further below, and the outer rim 23 of wheel 32 (and 38) is a single component, either integrally formed with a remainder of the wheel 32 (or 38) or attached to the remainder by appropriate means.

Referring again to FIGS. 4–4C, the continuous track 16A extends about the wheel train 14A so that the track 16A engages over the first wheel 32 and at least one of the remaining three wheels 34, 36 or 38 of the four wheels, preferably the fourth wheel 38, in all configurations of the vehicle 10. The continuous track 16A is preferably a conventional continuous track used with tracked toy vehicles. The continuous track 16A has gripping treads 43 located on an outer surface and a series of transverse ribs 44 on an inner surface that engage with the teeth 41 on the first and fourth wheels 32, 38, respectively, to prevent relative movement between the track 16A and the wheels 32, and 38 when the continuous track 16A is driven about the wheel train 14A as described below. Further, each transverse rib 44 of the track 16A includes a central tab 45 extending radially inward further than the remainder of the rib 44. Several of the tabs 45 are simultaneously disposed within and move through the annular recesses 29 of the wheels 32 and 38, and through recesses (not shown) in wheels 34 and 36, of the wheel train 14A as the continuous track 16A rotates about the wheel train 14A. The tabs 45 retain the track 16A engaged over the wheels of the wheel train 14A.

Still referring to FIGS. 4–4C, the linkage 18A pivotally connects the second pair of wheels, in other words, the second and fourth wheels 34, 38, respectively, with the chassis 12. The linkage 18A is configured to displace the second pair of wheels 34, 38 between a first wheel arrangement in which the wheels of the train 16A are generally disposed in a single row, as shown in FIG. 4, and a second wheel arrangement in which the wheels of the train 14 are generally disposed in two rows and all of the wheels engage the track 16A, as shown in FIG. 4C. In the first wheel arrangement (FIG. 4), the continuous track 16A forms less than four track sections, preferably two generally straight track sections 17A, 17B, each of which is substantially parallel to the other, or alternatively, are convergent in a direction toward the fourth wheel 38, and are tangent to each of the first wheel 32 and the fourth wheel 38. Further, it is within the scope of the present invention for the track 16A to form three generally straight track sections (not shown) in the first wheel arrangement, the sections extending between the first and fourth wheels 32, 38, respectively, and either of the second or the third wheels 34 or 36, respectively. In the second wheel arrangement at FIG. 4C, the continuous track 16 forms four generally straight track sections 19A, 19B, 19C and 19D, the track sections 19A–19D being substantially tangent to different pairs of wheels 32, 34, 36 and 38. It should be recognized that "generally straight" track sections will, in fact, sag or even bulge between the wheels on which the ends of such sections terminate.

Preferably, the linkage 18A comprises a drive link 48, a follower link 50, and a connecting link 52. Referring to FIGS. 4A and 5, the drive link 48 has a first end 49 (shown in FIG. 5) which is connected with the chassis 12 and a second end 51 which is connected with the second wheel 34. The follower link 50 has a first end 53 connected with the chassis 12 and a second end 54 connected with the fourth wheel 38. The connecting link 52 has a first end 55 connected with the drive link 48 and a second end 56 connected with the follower link 50. The ends 55, 56 of the connecting link 52 are preferably rotatably joined to the drive link 48 and the follower link 50, respectively, by standard pin-and-bearing pivots (not shown).

Figure 3:
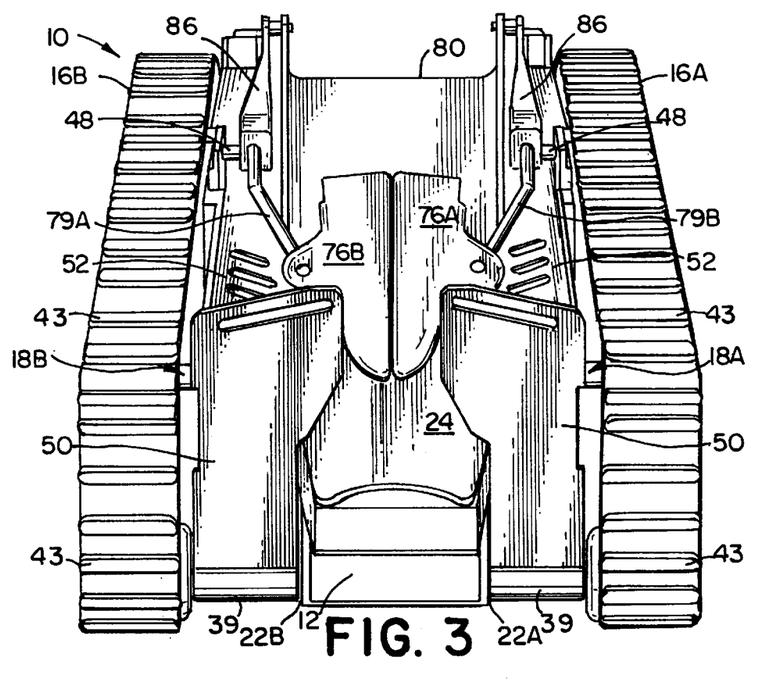
FIG. 3 is a front perspective view of the toy vehicle, shown in the second configuration.

Preferably, the first end 49 of the drive link 48 is rotatably mounted to the axle 33 of the first wheel 32 and the first end 53 of the follower link 50 is rotatably mounted to the axle 35 of the third wheel 36, so that the linkage 18A is thereby connected to the chassis 12 through the axles 33, 35. Further, the axle 37 of the second wheel 34 is preferably supported on the second end 51 of the drive link 48 and the axle 39 of the fourth wheel 38 is preferably supported on the second end 54 of the follower link 50. Each axle 37, 39 extends outwardly from the links 48, 52, respectively, preferably above (as depicted in FIG. 4C) the pivots (not shown) joining the drive and follower links 48, 50, respectively, to the connecting link 52, although alternatively, the ends 55, 56 of the connecting link 52 can be mounted on the axles 37, 39. Furthermore, the drive link 48 and the follower link 50 are each generally L-shaped with a transverse portion extending between the wheel train 14A and the chassis 12 so as to simulate body portions (e.g., fairings) of a racing-type vehicle when the linkage 18A is in a first position (FIG. 1) and body portions (e.g., engine compartment) of a bulldozer-type vehicle when the linkage 18A is in a second position (FIGS. 2 and 3).

Although the above-described configuration of the linkage 18A is preferred, it is within the scope of the present invention to construct the linkage 18A in any other appropriate manner that enables the toy vehicle 10 to operate in a same or similar manner as described above and below. For example, the second end 54 of the follower link 50 can be directly connected to the chassis 12 (instead of to the axle 39) or the second and fourth wheels 34, 38, respectively, can each be mounted to the connecting link 52 (instead of the drive link 48 and follower link 50). Alternatively, the linkage 18A can be configured to move a different pair of wheels, such as for example, a pair formed by the second and third wheels 34, 36, respectively, between similar first and second wheel arrangements, in which the wheels and the track along a lateral side 22A (or 22B) of the vehicle 10 are configured in a single row or alternatively in two rows, with the track 16A being configured as described above. The present invention is intended to embrace these and other alternative configurations of the linkage 18A that moves the wheel train 16A between the same two general wheel arrangements.

Figure 6:
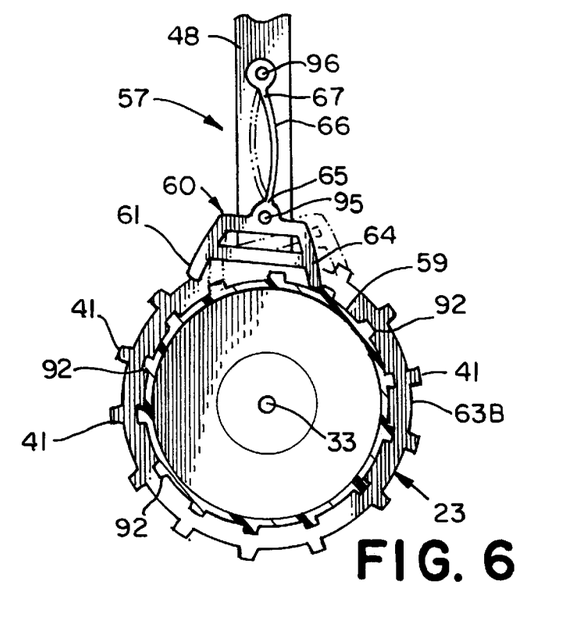
FIG. 6 is a view through line 6—6 of FIG. 5.

Referring to FIGS. 5 and 6, the toy vehicle 10 further comprises a drive mechanism 57 having a first end 58 connected with the linkage 18A and a second end 59 connected with the first wheel 32. The mechanism 57 is configured such that rotation of the first wheel 32 in a first direction drives the linkage 18A in a first direction to displace the second pair of wheels 42 from the first wheel arrangement (FIG. 4) to the second wheel arrangement (FIG. 4C) and rotation of the first wheel 32 in a second, opposite direction drives the linkage 18A in a second, opposite direction to displace the linkage 18A and the second pair of wheels (34 and 38) from the second wheel arrangement (FIG. 4C) to the first wheel arrangement (FIG. 4).

Preferably, the drive mechanism 57 includes a pawl 60 attached to the drive link 48 and a ratchet 62 attached to the first wheel 32. The pawl 60 is engageable with the rachet 62 to releasably couple the drive link 48 to the first wheel 32, such that rotation of the first wheel 32 rotates the drive link 48 between two extreme positions of the drive link 48 and the first wheel 32 otherwise rotates independently of the drive link 48. More specifically, rotation of the first wheel 32 in a first direction rotates the drive link 48 from a first (FIG. 4) to a second (FIG. 4C) extreme position of the drive link 48 and rotation of the first wheel 32 in a second, opposite direction rotates the drive link 48 from the second (FIG. 4C) to the first (FIG. 4) extreme position of the drive link 48. Preferably, the pawl 60 is a double-ended pawl and the rachet 62 is a conventional, toothed rachet wheel located between two larger diameter sub-rims 63A, 63B so that the rachet wheel 62 and the sub-rims 63A, 63B together form the inner rim 23 of the first wheel 32.

Referring particularly to FIGS. 5 and 6, the pawl 60 is preferably rotatably attached to the drive link 48 by a first pivot 95 and the vehicle 10 further includes a lever member 66 attached to and configured to rotate the pawl 60. The lever member 66 is preferably a thin, flat, resilient elongated leaf having a first end 65 attached to the pawl 60 and a second end 67 attached to the drive link 48, preferably to a second pivot 96, proximal to the second end 51 of the drive link 48. The lever member 66 extends along a surface of the drive link 48 disposed with its narrowest dimension generally perpendicular to the surface of the link 48. The lever member 66 is sized to be longer than the distance between the pivots 95, 96, so that it "bows" toward either the right or left longitudinal edges of the drive link 48 in FIG. 6. Preferably, the pawl 60 and lever member 66 are a one-piece construction, although alternatively, the pawl 60 and lever member 66 can be two separate pieces joined together by appropriate means.

As shown in FIGS. 4A–4C, the drive mechanism 57 further includes a fixed member 68 disposed on the connecting 52 link so as to be contactable with the lever member 66 to rotate the pawl 60 to move a first end 61 of the pawl 60 out of engagement with the rachet 62 when the drive link 48 has moved from a first (FIG. 4) to a second (FIG. 4C) position. Preferably, the connecting link 52 also includes a second fixed member 70 disposed to deflect lever member 66 and rotate the pawl 60 to move a second end 64 of the pawl 60 out of engagement with the rachet 62 after the drive link 48 has moved from a second (FIG. 4C) to a first (FIG. 4) position. The fixed members 68, 70 each have a portion extending toward the drive link 48 that includes a contacting end 69, 71, respectively (See FIG. 4). The fixed members 68, 70 preferably are arranged generally perpendicular to each other so that the end 69 of the first fixed member 68 extends generally perpendicularly across the drive link 48 in the second position of the linkage 18A (FIG. 4C) and the end 71 of the second fixed member 70 extends generally perpendicularly across the drive link 48 in the first position of the linkage 18A (FIG. 4), as explained in further detail below.

Referring to FIGS. 4, 4A and 6, when the linkage 18A is in the first position shown in FIG. 4 and the first wheel 32 is rotated in the first (clockwise) direction, the first end 61 of the pawl 60 "catches" on one of the teeth 92 of the ratchet wheel 62 so that the first wheel 32 pushes the pawl 60 and drive link 48 upwardly and rearwardly to drive the linkage 18A in the first direction as described above. As the linkage 18A moves from the first position (FIG. 4) to the second position (FIG. 4C), the linkage 18A moves the second pair of wheels (34, 38) of the wheel train 14A from the first wheel arrangement shown in FIG. 4 sequentially through the position shown in FIG. 4A, then through the position shown in FIG. 4B and finally to the second wheel arrangement as shown in FIG. 4C.

As the linkage 18A approaches the second position (FIG. 4C), relative movement between the drive link 48 and the connecting link 52 causes the end 69 of the first fixed member 68 to move into contact with the lever member 66. The fixed member 68 pushes against the bowed central portion of the lever member 66 until the central portion bends in a reverse direction (e.g. from left (dashed lines) to right side (solid lines) of the link 48 in FIG. 6), causing the attached pawl 60 to rotate about the first pivot 61 so that the first end 61 moves out of engagement with the ratchet teeth 92. The resiliency of lever member 66 causes it to snap from one bowed position (phantom in FIG. 6) to its other bowed position (solid in FIG. 6). Simultaneously, the rotation of the pawl 60 causes the second end 64 to move proximal to the ratchet 62 so that the second end is intermittently contacted by the ratchet teeth 92 as the first wheel 32 continues rotating in the first direction. Although the ratchet teeth 92 are able to push the second end 64 temporarily upward and move past the second end 64, enabling the first wheel 32 to rotate independently of the drive link 48, the intermittent contact between the ratchet teeth 92 and the second end 64 of the pawl 60 prevents the drive link 48 from rotating in the second, opposite direction (frontwardly and downwardly), maintaining the wheel train 14 in the second wheel arrangement shown in FIG. 4C.

When the linkage 18A is in the second position (FIG. 4C) and the first wheel 32 is rotated in the second, opposite (counter-clockwise) direction, an "outer" side of the second end 64 of the pawl 60 catches on one of the teeth 92 of the ratchet 62 so that the first wheel 32 pushes the drive link 48 frontwardly and downwardly, driving the linkage 18A in the second, opposite or "frontward" direction as described above. As the linkage 18A approaches the first extreme position (FIG. 4), the end 71 of the second fixed member 70 on the connecting link 52 moves into contact with and bends the lever member 66 back to the initial position shown in FIG. 4, causing the pawl 60 to rotate to the phantom orientation of FIG. 6 and move the second end 64 out of engagement with the ratchet teeth. The first wheel 32 is then able to continue rotating in the second (counter-clockwise) direction independent of the linkage 18A.

Although the double-ended pawl and ratchet arrangement described above is preferred, it is within the scope of the present invention to utilize different pawl-rachet arrangements. In a first alternative, the vehicle 10 can include a single pawl 60 that is single-ended (not shown) and engageable with the rachet 62 only when the first wheel rotates in a first direction. A single-ended pawl 60 would only rotate the drive link 48 from a first to a second position of the drive link 48, and would not retain the linkage in the second position or engage the rachet 62 when the first wheel 32 rotates in a second, opposite direction. In such a case, the toy vehicle 10 may include other means to rotate the pawl 60 from the second position to the first position, such as a friction clutch (not shown) disposed between the first wheel 32 and the first end 49 of the drive link 48. In a second alternative configuration, the toy vehicle 10 can include two single-ended pawls 60 as described immediately above, with each pawl connected to a separate lever member or the same lever member (neither shown), the lever member(s) being manipulated by fixed members (not shown) on the connecting link 52. With the two single-ended pawls, one pawl would be engageable with the rachet 62 when the first wheel 32 rotates in a first direction and the other pawl would be engageable with the ratchet 62 when the first wheel 32 rotates in a second, opposite direction, with each fixed member 68 or 70 causing one of the pawls to disengage from the ratchet 62 at an appropriate point. Either arrangement would function similarly to the double-ended pawl arrangement as described above. In a third alternative, a single-ended, resiliently flexible pawl (not shown) can be provided engaging teeth at the rachet 62 as the first wheel rotates in either direction. When the linkage 18A reached the end of its movement, the teeth 92 of the rachet 62 would continue to sequentially contact and deflect the end of the pawl out of the way.

Further, it also within the scope of the present invention to utilize any other conventional means to releasably couple the linkage 18A with one or more of the wheels of the wheel train 14A so that rotation of the one or more wheels drives the linkage 18A at least from a first position to a second position. For example, a friction clutch mechanism (not shown) disposed between one of the wheels of the wheel train 14A and one of the links of the linkage 18A and configured to operate in the above-described manner.

Finally, an independent, remotely controlled drive mechanism, such as a solenoid, can be coupled to the linkage 18A to independently control the orientation/position of the linkage 18A (or 18B) with respect to the chassis 12. These last three alternative designs are less efficient and subject to higher friction and/or wear than the preferred and first alternative designs, but would still be suitable for less expensive and/or less durable toy vehicle.

Referring to FIGS. 4–4C and 7, the toy vehicle 10 further comprises a lock mechanism 72 at least partially disposed on one of the linkage 18A and the chassis 12 and having a portion 73 releasably engageable with the linkage 18A. The lock mechanism 72 is configured to maintain the linkage 18A in the second position in which the second pair of wheels are in the second (FIG. 4C) wheel arrangement. Preferably, as best shown in FIG. 7, the lock mechanism 72 has a base portion 74 attached to the connecting link 52 and a lever 75 pivotally connected to the base and including the portion 73 that is configured to "trap" the outer longitudinal edge 26 of the drive link 48, preventing relative movement between the drive link 48 and connecting link 52 and thereby maintaining the linkage 18A in the second position. The lever 75 is manually pivotable about the base portion 74 and is ordinarily disposed in the "open" position shown in FIG. 7 when not engaged with the lever member 48.

However, it is within the scope of the present invention to construct the lock mechanism 72 in any other appropriate manner that enables the linkage 18A to be maintained in the second position. For example, the lock mechanism 72 can be a sliding key (not shown) mounted on one link and engageable with an opening (not shown) in a second link or the lock mechanism 72 can be positioned so as to extend between the follower link 50 and the connecting link 52 or between one of the links and the chassis 12. Further, it is also within the scope of the present invention to construct the toy vehicle 10 without a lock mechanism, the over-center configuration of the drive link 48 in the second position, as shown in FIG. 4C, in combination with the intermittent contact between the second end 64 of the pawl 60 and the ratchet teeth 92, is sufficient to maintain the linkage 18A in the second position.

Referring to FIGS. 1–4, the toy vehicle 10 further comprises a body panel 76A connected with the linkage 18A so that the body panel 76A displaces from a first position (FIGS. 1 and 4) to a second position (FIGS. 2 and 3) as the linkage 18A displaces the second pair of wheels 34, 38 from the first wheel arrangement to the second wheel arrangement. The toy vehicle 10 preferably includes a second body panel 76B connected with the second linkage 18B that is substantially identical to, but is a mirror image of, the first body panel 76A. Further, each body panel 76A, 76B has a first end 77A, 77B, respectively, pivotally attached to the first end 53 of a follower link 50 and a second end 78A, 78B fixedly attached to a separate elongated bar 79A, 79B, respectively, that is pivotally attached to an adjoining drive link 48. Preferably, the body panels 76A, 76B form a frontward "nose cone" portion of a racing-type vehicle when the linkages 18A, 18B are in the first position (FIGS. 1 and 4) and form a cab or operator-housing portion of a bulldozer-type vehicle when the linkages 18A, 18B are in the second position (FIGS. 2 and 3).

Referring now to FIGS. 1–4, the toy vehicle 10 further comprises a generally planar member 80 rotatably attached, either directly to the chassis 12 or indirectly to the chassis 12 through being directly attached to the body 24 of the toy vehicle 10. The member 80 is connected with the linkage 18A so that the member 80 rotates from a first position (FIGS. 1 and 4) in which the member 80 is disposed generally horizontally above a remainder of the vehicle 10 simulating a vehicle "wing" to a second position (FIGS. 2 and 3) in which the blade 80 is disposed generally vertically and adjacent to an end, preferably the rear end 21, of the chassis 12 simulating a "blade" when each linkage 18A displaces the second pair of wheels 34, 38 from the first wheel arrangement to the second wheel arrangement.

Preferably, as best shown in FIG. 4, the member 80 includes a shaft 82 terminating in a ball 81 and the toy vehicle 10 includes a socket portion 83 attached to the body 24 of the toy vehicle 10. The socket portion 83 is preferably configured to restrict the movement of the ball 81 and shaft 82 to a vertical plane parallel to the plane of FIGS. 4–4C so that the member 80 rotates about 90°. Preferably, a separate flexible member 86, such as a band of rubber, extends between a forward upper portion of each lateral end of the simulated blade 80 and a separate one of the linkages 18A, 18B, preferably each being attached to a separate drive link 48, as best shown in FIG.3. The flexible members 86 connect the simulated wing/blade 80 with the linkages 18A, 18B so that the simulated wing/blade 80 moves from the first position to the second position, as described above, when both of the linkages 18A, 18B displace the second pair 42 of wheels between the two arrangements described above.

Although the member 80 is preferably configured as a wing/bulldozer shovel blade, it is within the scope of the present invention to configure the member 80 to simulate any other type of construction blade or other equipment, such as for example a bucket of a backhoe loader (not shown), particularly if configured to resemble a portion of a racing or passenger vehicle when disposed in the first position. Further, the present invention is intended to embrace the substitution of the member 80 for any other type of device, such as a simulated weapon, attached to the linkage so as to be moveable between two positions with the linkage, particularly ones that simulate portions of a racing or passenger vehicle body in a first position.

Referring now to FIGS. 4 and 5, the toy vehicle 10 further comprises a motor 88 mounted to the chassis 12 and a drive axle 89 connected with the motor 88. The drive axle 89 is further drivingly engaged with the first wheel 32 of the wheel train 14A, as shown in FIG. 5, so that the motor 88 rotates the continuous track 16A through the first wheel 32 to move the vehicle 10. Preferably, the motor 88 is attached to a lower rear of the chassis 12 and is engaged with the drive axle 89 through a gear train (not shown) in a manner similar to the connection of the motors and drive axles of the vehicle of U.S. Pat. No. 5,135,427. The drive axle 89 may be solid or hollow. If hollow, it may be mounted on a non-rotating stub shaft for support.

However, those skilled in the art will recognize that there can be alternative devices for connecting the motor 88 and the drive axle 89 or the first wheel 32, such as with a belt between two pulleys or by arranging the shaft (not shown) of the motor collinear with the axle 89 and directly connecting the motor shaft to either the axle 89 or the first wheel 32. The motor 88 is preferably a conventional electric motor, such as described in U.S. Pat. No. 5,135,427, although the motor 88 can alternatively be an internal combustion engine or, although not preferred, a pneumatic or spring powered motor (none shown).

In the preferred configuration of the toy vehicle 10, the toy vehicle 10 comprises two motors 88 (only one shown) mounted to the chassis 12 and two drive axles 89 (only one shown), each drive axle 89 being drivingly engaged with the first wheel 32 of a separate wheel train 14A, 14B respectively, and with a separate motor 88, such that each motor 88 rotates the first wheel 32 of a connected wheel train 14A, 14B to rotate the connected continuous track 16A, 16B and move the vehicle 10. With this motor arrangement, each motor 88 can drive the connected wheel train 14A, 14B separately from the other, so that the toy vehicle 10 can be moved by cooperative action of the two wheel trains 14A, 14B or turned both of by driving only one wheel train 14A, 14B or by driving the wheel trains in opposite linear movement directions.

Alternatively, the toy vehicle 10 can be provided with only a single motor 88 or two motors paired to rotate drive axle 89 and the drive axle 89 can be provided with a second end (not shown) drivingly engaged with the first wheel 32 of the second wheel train 14B. The motor(s) 88 rotates the first wheel 32 of both wheel trains 14A, 14B simultaneously to simultaneously rotate the connected continuous tracks 16A, 16B, respectively, and thereby move the vehicle 10. With this alternative configuration of the toy vehicle 10, the wheel trains 14A, 14B do not rotate independently of each other, and thus the toy vehicle 10 cannot be turned by action of the wheel trains. However, transmissions are also known in the field which allow the output from a single motor or paired motors operating together to be transmitted along separate axles to the drive wheels 32 of each train 14A, 14B in either the same driving direction (e.g. forward or reverse) or in opposing driving directions, thereby permitting the vehicle to be turned or spun in place.

Although it is preferred that the toy vehicle 10 has at least one motor 88, and most preferably two motors 88, it is within the scope of the present invention to construct the toy vehicle 10 without any motors. If so constructed, the toy vehicle 10 is operated by manually pushing the vehicle 10 so that the wheels, particularly the first wheels 32, rotate in either the first direction or the second, opposite direction as described above. The linkages 18A, 18B operate in the same manner as described above to move the second pair 42 of wheels between the first and second wheel arrangements and vice-versa.

Preferably, most of the components of the toy vehicle, including the chassis, body, linkages, wheels and blade, are constructed of molded polymeric materials. The continuous track 16 is preferably formed of a natural rubber or synthetic rubber material. However, those skilled in the art will recognize that other materials can be utilized to construct the toy vehicle, such as, for example, constructing the simulated blade of stamped metal. The present invention is intended to embrace all such appropriate alternative configurations and materials and/or processes for constructing the various components of the toy vehicle 10.

Figure 1:
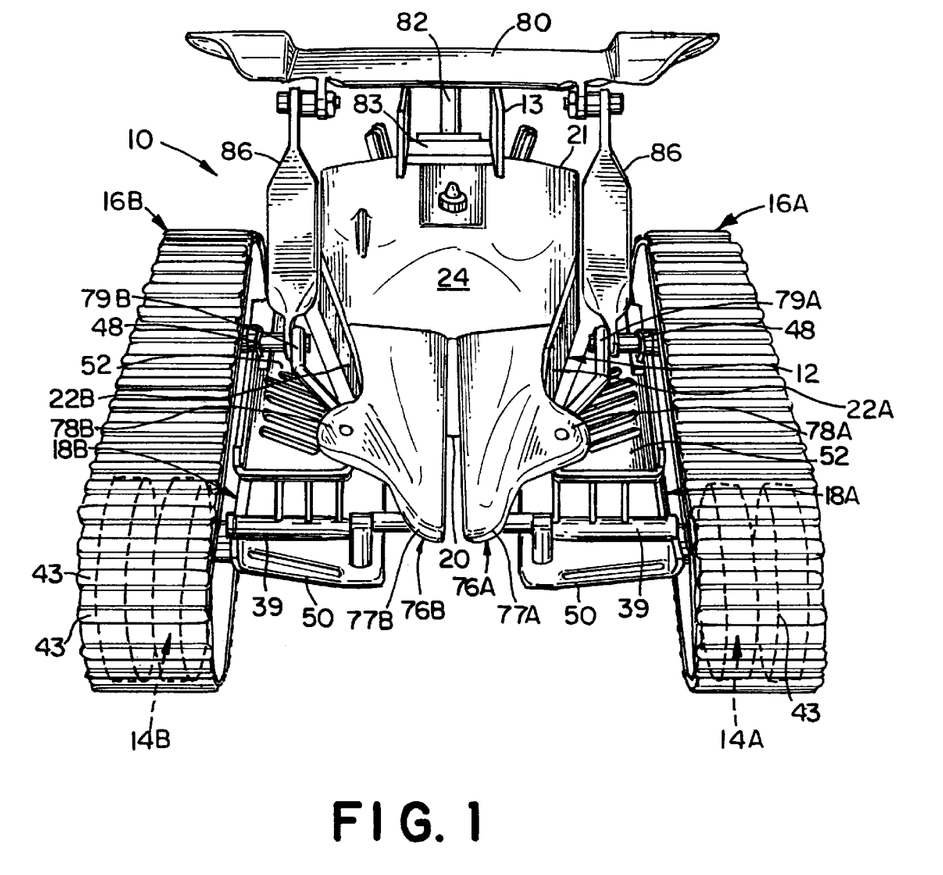
FIG. 1 is a front perspective view of a tracked toy vehicle in accordance with the presently preferred embodiment of the present invention, shown in a first configuration.

In use, the toy vehicle 10 is preferably initially operated with the linkages 18A, 18B disposed in the first position (FIG. 4) such that the toy vehicle 10 is configured as a racing-type vehicle (FIGS. 1 and 4). Preferably, a radio controller, for example, like that disclosed in U.S. Pat. No. 5,135,427, is used to transmit control signals to the motors 88, although, alternatively, the motors can be "switched-on" manually. In the preferred configuration, each motor 88 drives the connected first wheel 32 through the respective drive axle 89 so that the connected continuous tracks 16A, 16B are rotated about the wheel train 14A, 14B, respectively, to pull the vehicle 10 in a frontward direction.

When desired, the user can either transmit a control signal, or move a manual switch, so that the motors 88 reverse direction and rotate the first wheels 32 in a rearward (the "first") direction. As the vehicle 10 travels in the opposite direction, with the rear end 21 of the chassis 12 being the leading end of the vehicle 10, the pawl-ratchet drive mechanisms 57 on either lateral side of the vehicle 10 cause each drive link 48 to be rotated by the coupled first wheel 32 to the second linkage position (FIG. 4C), in the manner described above. The two linkages 18A, 18B displace the second pair of wheels 34, 38 of each wheel train 14A, 14B to the second wheel arrangement (FIG. 4C). Simultaneously, the body panels 76A, 76B and the simulated blade 80 each move from the first to second positions, as described above, so that the toy vehicle 10 is configured as and has the over-all appearance of a bulldozer-type vehicle. The linkages 18A, 18B can be maintained in the second position while driving the vehicle 10 forwardly or rearwardly by manually engaging the lock mechanisms 72 as described above. With the simulated blade 80 in the second, lowered position, the blade 80 can be utilized to move small objects in a manner analogous to the operation of a full-sized bulldozer. Further, the toy vehicle 10 can be operated in an "upside-down" orientation, with track section 19B in contact with a ground surface and pulling the vehicle 10, when the each of the wheel trains 14A, 14B are "locked" in the second wheel arrangement (FIG. 4C).

When the user desires to again operate the toy vehicle 10 as a racing-type vehicle, the user must first disengage the lock mechanisms 72 if the mechanisms 72 have been utilized. Then, the motors 88 are again reversed in direction, again preferably by a remotely transmitted control signal, so that the first wheels 32 rotate in the second, opposite (i.e., frontward) direction. The linkages 18A, 18B are then rotated from the second (FIG. 4C) to the first (FIG. 4) positions by action of the pawl-ratchet drive mechanisms 57 and move the second pair of wheels 34, 38 of each wheel train 14A, 14B from the second to the first wheel arrangements. With the toy vehicle 10 once again being configured as a racing vehicle, the toy vehicle 10 moves with the front end 20 of the chassis 12 being the leading end.

Alternatively to driving both linkages 18A, 18B rearwardly or frontwardly simultaneously, in the preferred embodiment of the toy vehicle 10, one motor 88 can be rotated in a first direction as the other motor 88 is rotated in a second, opposite direction, so that only one wheel train 14A or 14B is moved to the second wheel arrangement while the other wheel train 14B, 14A remains in the first wheel arrangement. When the toy vehicle 10 is operated in this manner, vehicle 10 turns roughly about the center of the vehicle 10 by opposing action of the wheel trains 14A, 14B when both motors 88 are operated and roughly about the middle of the non-driven track 16A or 16B when only one of the two motors 88 is being operated.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A toy vehicle comprising:
   a chassis having a front end, a rear end and first and second lateral sides extending between the ends;
   a wheel train disposed on the first lateral side of the chassis and including first, second, third and fourth wheels, a first pair of the wheels of the train being mounted on separate axles fixed with respect to the chassis and a second pair of the wheels of the train being mounted on separate axles movable along the first lateral side of the chassis; and
   a continuous track extending (about the wheel train) so that the track engages over the first wheel and at least one of the remaining three wheels of the four wheels; and
   a linkage connecting the second pair of wheels with the chassis and configured to displace the second pair of wheels between a first wheel arrangement in which the wheels of the train are generally disposed in a single row and a second wheel arrangement in which the wheels of the train are generally disposed in two rows and all four wheels engage the track.

2. The toy vehicle as recited in claim 1 wherein the second pair of wheels are the second and fourth wheels of the train and the linkage comprises:
   a drive link having a first end connected with the chassis and a second end connected with the second wheel;
   a follower link having a first end connected with the chassis and a second end connected with the fourth wheel; and
   a connecting link having a first end connected with the drive link and a second end connected with the follower link.

3. The toy vehicle as recited in claim 2 wherein the vehicle further comprises a double-ended pawl attached to the drive link and a ratchet attached to the first wheel, the pawl being engageable with the ratchet to releasably couple the drive link to the first wheel, such that rotation of the first wheel rotates the drive link between two extreme positions of the drive link and the first wheel otherwise rotates independently of the drive link.

4. The toy vehicle as recited in claim 3 wherein the pawl is rotatably attached to the drive link, the vehicle further includes a lever member attached to the pawl and configured to rotate the pawl and a fixed member disposed on the connecting link so as to be contactable with the lever member to rotate the pawl to move an end of the pawl out of engagement with the ratchet as the drive link moves from a first to a second position.

5. The toy vehicle as recited in claim 2 wherein the vehicle further includes at least one pawl attached to the drive link and the first wheel includes a ratchet, the pawl being engageable with the ratchet to releasably couple the drive link to the first wheel, such that rotation of the first wheel in a first direction rotates the drive link from a first to a second position of the drive link and the first wheel otherwise rotates independently of the drive link.

6. The toy vehicle as recited in claim 1 wherein the vehicle further comprises a drive mechanism having a first end connected with the linkage and a second end connected with the first wheel such that rotation of the first wheel in a first direction drives the linkage in a first direction to displace the second pair of wheels from the first wheel arrangement to the second wheel arrangement and rotation of the first wheel in a second, opposite direction drives the linkage in a second, opposite direction to displace the second pair of wheels from the second wheel arrangement to the first wheel arrangement.

7. The toy vehicle as recited in claim 1 further comprising a lock mechanism at least partially disposed on one of the linkage and the chassis and having a portion releasably engageable with the linkage, the lock mechanism being configured to maintain the linkage in a position in which the second pair of wheels are in the second wheel arrangement.

8. The toy vehicle as recited in claim 1 wherein the first wheel is in driving engagement with the continuous track and the vehicle further comprises a motor mounted to the chassis and a drive axle connected with the motor, the drive axle being further drivingly engaged with the first wheel of the wheel train so that the motor rotates the continuous track through the first wheel to move the vehicle.

9. The toy vehicle as recited in claim 1 further comprising a second wheel train with a second continuous track disposed on the second lateral side of the chassis, two motors mounted to the chassis and two drive axles, each drive axle being drivingly engaged with the first wheel of a separate wheel train and with a separate motor such that each motor rotates the first wheel of a connected wheel train to rotate the connected continuous track and move the vehicle.

10. The toy vehicle as recited in claim 9 further comprising a member rotatably attached to the chassis, the member being connected with the linkage so that the member rotates from a first position in which the member is disposed above a remainder of the vehicle to a second position in which the member is disposed generally adjacent to an end of the chassis when each linkage displaces the second pair of wheels from the first wheel arrangement to the second wheel arrangement.

11. The toy vehicle as recited in claim 1 further comprising a body panel connected with the linkage so that the body panel displaces from a first position to a second position as the linkage displaces the second pair of wheels from the first wheel arrangement to the second wheel arrangement.

12. A toy vehicle comprising:
    a chassis having a first end, a second end and first and second lateral sides;
    a motor mounted to the chassis;
    a drive axle connected with the motor and having at least a first end;
    a wheel train disposed on the first lateral side of the chassis and including first, second, third and fourth wheels, the first and third wheels being mounted on axles fixed to the chassis, the drive axle being drivingly engaged with the first wheel, and the second and fourth wheels being mounted on axles movable along the first lateral side of the chassis;
    a continuous track extending about the wheel train so that the track engages over the first wheel and at least one of the remaining three wheels of the four wheels; and
    a linkage connecting the second and fourth wheels with the chassis and configured to displace the second and fourth wheels from a first wheel arrangement to a second wheel arrangement.

13. The toy vehicle as recited in claim 12 further comprising a second wheel train with a second continuous track disposed on the second lateral side of the chassis and wherein the drive axle has a second end drivingly engaged with the first wheel of the second wheel train so that the motor rotates the first wheel of both wheel trains to rotate the connected continuous tracks and move the vehicle.

14. The toy vehicle as recited in claim 12 further comprising a second wheel train with a second continuous track disposed on the second lateral side of the chassis, a second motor mounted to the chassis and a second drive axle connected with the second motor and with the first wheel of the second wheel train, such that each motor rotates the first wheel of each train to rotate the track of each train and move the vehicle.

15. A toy vehicle comprising:
    a chassis having a front end, a rear end and first and second lateral sides extending between the ends;
    at least one wheel train disposed on the first lateral side of the chassis and including first, second, third and fourth wheels, the first and third wheels being mounted on axles fixed to the chassis and the second and fourth wheels being mounted on axles movable along the first lateral side of the chassis; and
    a continuous track extending about the wheel train so that the track engages over at least the first wheel and the fourth wheel of the wheel train; and
    at least one linkage connecting the second and fourth wheels with the chassis, the linkage moving the second and fourth wheels from a first wheel arrangement in which the continuous track forms less than four track sections to a second wheel arrangement in which the continuous track forms four generally straight track sections, the track sections being substantially tangent to different pairs of wheels.

* * * * *